May 10, 1927.
B. McCLELLAND
1,628,169
COMPOUND GAUGE
Filed Nov. 6, 1924
2 Sheets-Sheet 1
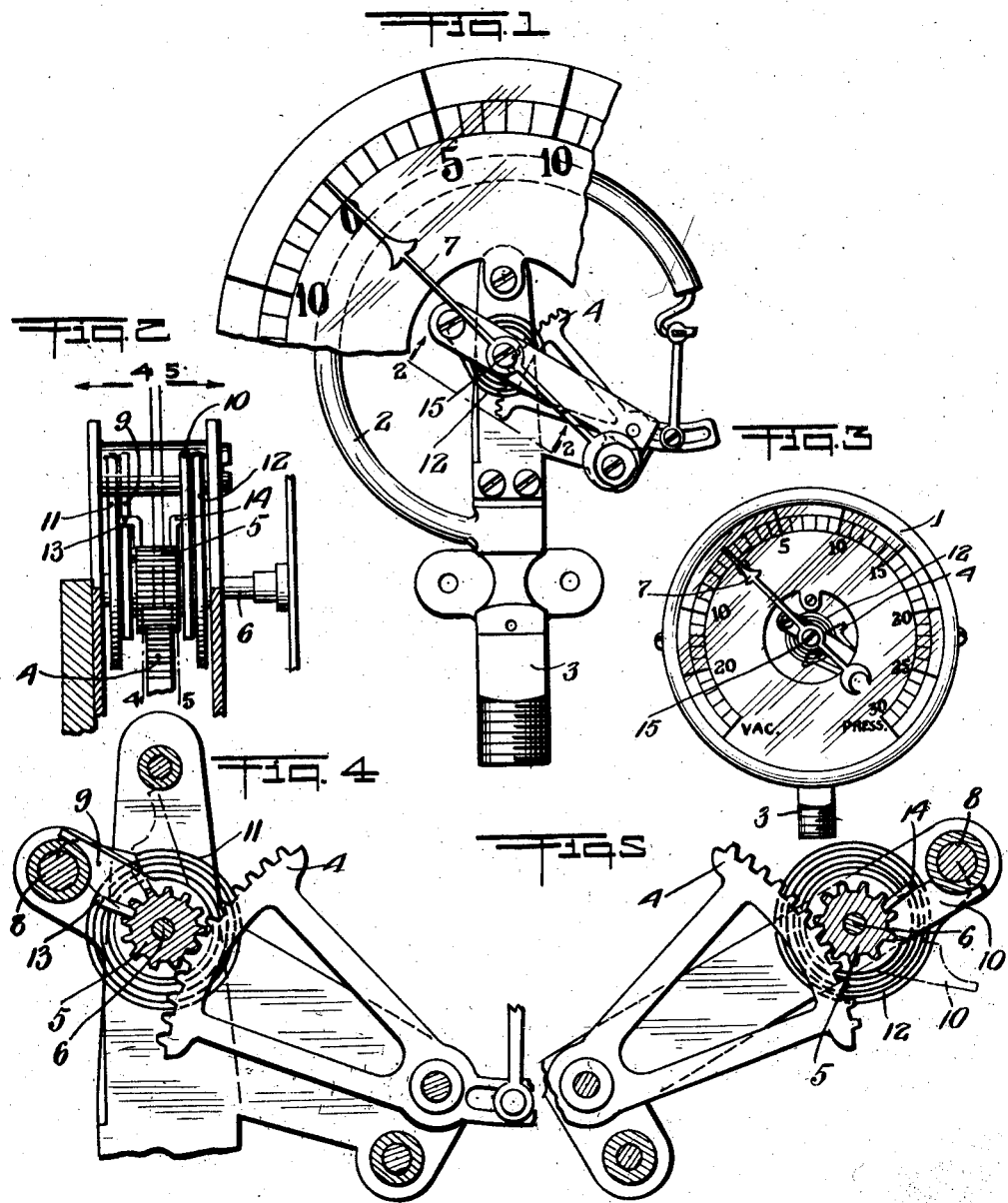
INVENTOR
BERT McCLELLAND
BY Parker W. Page,
ATTORNEY May 10, 1927.
B. McCLELLAND
1,628,169
COMPOUND GAUGE
Filed Nov. 6, 1924
2 Sheets-Sheet 2
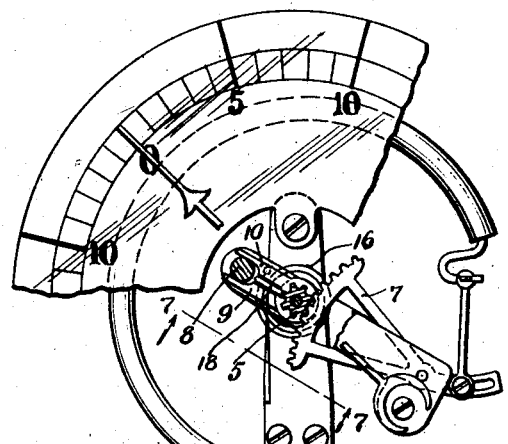
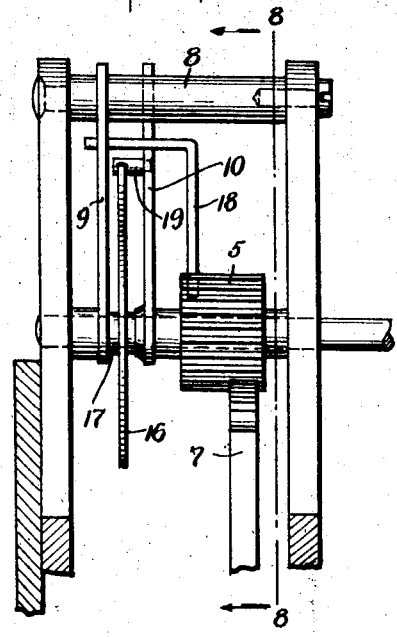
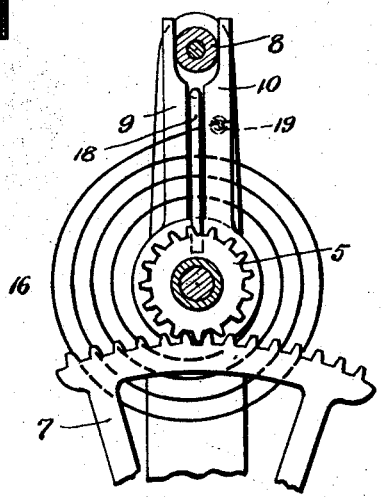
INVENTOR
BERT McCLELLAND
BY Parker W. Page
ATTORNEY Patented May 10, 1927.

1,628,169

UNITED STATES PATENT OFFICE.

BERT McCLELLAND, OF PERKASIE, PENNSYLVANIA, ASSIGNOR TO UNITED STATES GAUGE COMPANY, OF SELLERSVILLE, PENNSYLVANIA, A CORPORATION OF PENNSYLVANIA.

COMPOUND GAUGE.

Application filed November 6, 1924. Serial No. 748,080.

My present invention pertains to pressure and vacuum gauges and is embodied in what is known as a compound gauge, or, in other words, one that indicates either a positive or a negative pressure.

Whenever, as is usually the case, a single pointer moved by a Bourdon tube is used in these gauges, great difficulty is encountered in maintaining the pointer at the neutral or zero point on the indicating scale under conditions of no pressure. Many expedients have been adopted and tried for this purpose, usually by the use of some form of light spring primarily adjusted to maintain the pointer at the zero point when the Bourdon tube is subjected to no pressure, but such expedients are only partially successful. A change in the position of the instrument results in the weight of the pointer throwing it out of its proper position. The spring, subject to slight variations in its elasticity or tension, also acts to shift the pointer, and other causes of like nature have made the problem of proper positioning of the pointer difficult.

I have succeeded in producing a compound gauge using a single pointer which fully and perfectly overcomes all of the above mentioned objections. In my improved instrument I use the usual mechanism comprising a Bourdon tube and a pivoted sector which gears with the pointer spindle to move the latter over the scale in proportion to the pressure to which the tube is subjected. On the same shaft or spindle which carries the pinion, however, I mount loosely two arms or plates, and in their path of movement I mount a rod or bar constituting a fixed limiting stop at a relatively short distance from the shaft, Around the shaft I place two light spiral springs, connecting one end of each to the said bar and the other to the adjacent loosely mounted arm, the springs being so arranged as to exert a light force upon the arms tending to move them in opposite directions or into contact with opposite sides of the rod, or as a modification I use a single spiral spring, one end connected to one of said arms and the other end to the hub of the other arm, exerting upon the two arms force in opposite directions. Normally, therefore, both arms lie in contact with the rod and on opposite sides of the same.

From the pinion on the pointer shaft extend two pins in case two springs are used which overlie opposite sides of the two spring actuated plates or arms, and when no pressure is acting on the Bourdon tube these arms acting upon the pinion turn it until both arms rest upon the stop rod, and the pointer is brought to the exact zero position. In this position it must remain at all times when no pressure is acting upon the Bourdon tube tending either to expand or contract it from its normal position. When only one spring is used a single bent arm extends from the pinion and lies between the two arms which moves either one or the other, according to the direction in which the pinion is turned.

This movement I have illustrated in the accompanying drawing:

Fig. 1 is a front view in elevation of the operative parts of the gauge, portions of the dial being shown.

Fig. 2 is a sectional view of a part of the mechanism along the line 2—2 in Fig. 1, viewed in the direction of the arrow.

Fig. 3 is a view in elevation of the complete gauge.

Fig. 4 is a sectional view of Fig. 2, on the line 4—4, looking to the left.

Fig. 5 is a similar view on the line 5—5 looking to the right.

Fig. 6 is a view in elevation of a modification.

Fig. 7 is an enlarged view on the line 7—7 of Fig. 6, and

Fig. 8 is a sectional view of the same scale on the line 8—8 of Fig. 7.

The gauge is contained in the usual casing 1, and comprises Bourdon tube 2 connected with the tube 3 to be attached to the source of pressure. The tube 2 is connected in any suitable manner with a pivoted sector 4 in gear with a pinion 5 on the spindle 6 of the pointer 7. These are essential parts of the usual and well known gauge mechanism.

At a short distance from the pinion shaft is a rod or bar 8 mounted on the supporting frame 25, and on the pinion shaft are two loosely mounted arms or plates 9 and 10, the ends of which are adapted to come in contact with said rod on opposite sides of the same and are properly fashioned so that when the arms are in contact with the said rod they will stand in substantially parallel position with one another. The arms 9 and 10 are impelled towards the rod 8 by two light spiral springs 11 and 12, one end of each being secured to a fixed part, as the rod 8, and the other end to the adjacent arm 9 or 10, and exerting a tendency to move the said arm into contact with the rod 8.

The pinion 5 is fixed to the pointer spindle and has two arms or stops 13 and 14 with bent ends that overlie the two arms 9 and 10 on opposite sides, and as the pinion may be turned by a very slight force when the Bourdon tube is in its neutral or normal position, the arms, under the action of the springs 11 and 12, rest in contact with opposite sides of the rod or bar 8, and maintain the pointer in its exact zero position.

When positive pressure acts upon the Bourdon tube it is expanded and the pinion is turned to the right with the result that the stop 13 forces the arm 9 to the right and moves the pointer over the scale to indicate the amount of such pressure. The stop 14 merely moves away from its arm 10.

The converse of this occurs when the Bourdon tube is subjected to a vacuum or negative pressure, for in this case the arm 10 is moved to the left by the stop 14, while the stop 13 merely leaves its arm stationary.

The pointer is secured to its spindle by friction and a screw driver slot 15 by means of which its relative position may be adjusted should occasion arise for such adjustment.

In Figs. 6 to 8 the modification which uses only a single spiral spring is shown. In these figures the construction of all parts is the same, but a single spring 16 is placed around the pinion shaft. One end is connected to a pin 19 set in the upper arm 10 and the other end to the hub 17 of the lower arm 9. This spring is designed to impel the two arms 9 and 10 in opposite directions and hold them in contact with the bar 8. In the pinion 5 is set on one side of the segment a single bent arm 18, the end of which extends between the two arms 9 and 10 and moves one or the other away from the rod 8 according to the character of the pressure acting on the segment, and the direction in which the latter is moved.

This gauge has been found to meet the most exacting conditions of the art. The additions required to meet the requirements to the ordinary gauge mechanism are extremely simple and of such character that no derangement is possible, and accuracy at all times is assured.

Having now described my invention, what I claim is:

1. In a compound gauge the combination with a pointer pinion and spindle and a pointer mounted thereon, of two freely rotatable arms, a spring acting against each of said arms, means on the pinion for moving one or the other of said arms according to the direction in which the pinion is turned and against the force of the spring associated with the arm thus moved, and a fixed limiting stop against which the said arms are held by their springs when the pointer is at the zero point of the scale.

2. In a compound gauge the combination with the pointer pinion and pointer moving with the pinion, of two freely movable rotating arms, a fixed stop therefor, two stops extending from the pinion and adapted to engage one or the other of said arms on opposite sides of the same depending upon the direction of rotation of the pinion, and springs in contact with said arms and acting in opposite directions with a tendency to force the arms into contact with the fixed stop and turn the pinion and pointer to zero.

3. In a compound gauge the combination with a pointer pinion and spindle, and a pointer mounted thereon, of two arms loosely mounted on the pinion shaft and spring impelled in opposite directions, a fixed stop towards which said arms are impelled, and means extending from the pinion into the path of the said arms and on opposite sides of the same for holding the pointer at zero when the arms are in contact with the stop.

4. In a compound gauge the combination with the pointer spindle, a pointer mounted thereon and a pinion by which the pointer is moved over its scale, of two loosely mounted arms on the pinion shaft, spiral springs surrounding said shaft, a stationary bar to which one end of each of said springs is connected, the other end of each of said springs being connected to the said arms respectively, whereby the arms are impelled in opposite directions toward said stationary bar, and arms moving with the pinion adapted to engage with the loosely mounted arms on opposite sides of the same.

5. In a compound gauge the combination with the pointer spindle, a pointer mounted thereon and a pinion by which the pointer is moved over the scale, of two arms loosely mounted on the pinion shaft, a bar constituting a fixed stop for said arms, spiral springs surrounding the spindle, each having one end connected to said bar and the other end connected to said arms and adapted to impel them in opposite directions towards said bar, stops or projections from opposite ends of the pinion adapted to overlie the path of movement of the respective arms, whereby the pinion shaft and the pointer will be turned to the exact zero position by the action of the springs when there is no pressure acting upon the gauge.

6. In a compound gauge, a movable indicator and pressure operated devices for moving the indicator in either direction from zero to indicate either positive or negative pressures, a fixed stop located to correspond to the zero position of the movable indicator, spring impelled, oppositely acting arms cooperating with said stop, and connections whereby said arms when in contact with the stop will hold the indicator at zero position.

In testimony whereof I hereto affix my signature.

BERT McCLELLAND.

Certificate of Correction.

Patent No. 1,628,169. Granted May 10, 1927, to

BERT McCLELLAND.

It is hereby certified that error appears in the printed specification of the above-numbered patent requiring correction as follows: Page 1, line 76, for the word "movement" read *improvement;* and that the said Letters Patent should be read with this correction therein that the same may conform to the record of the case in the Patent Office.

Signed and sealed this 21st day of June, A. D. 1927.

[SEAL.]
M. J. MOORE,
*Acting Commissioner of Patents.*